June 22, 1926.
W. F. KELLEY
1,589,398
SYSTEM FOR GUIDING VESSELS
Filed Dec. 11, 1922
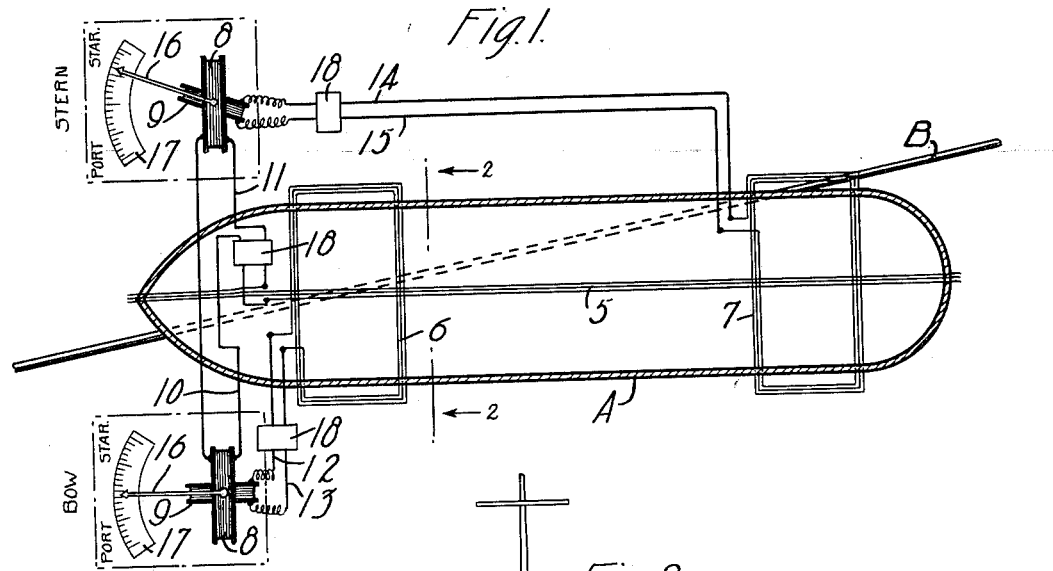
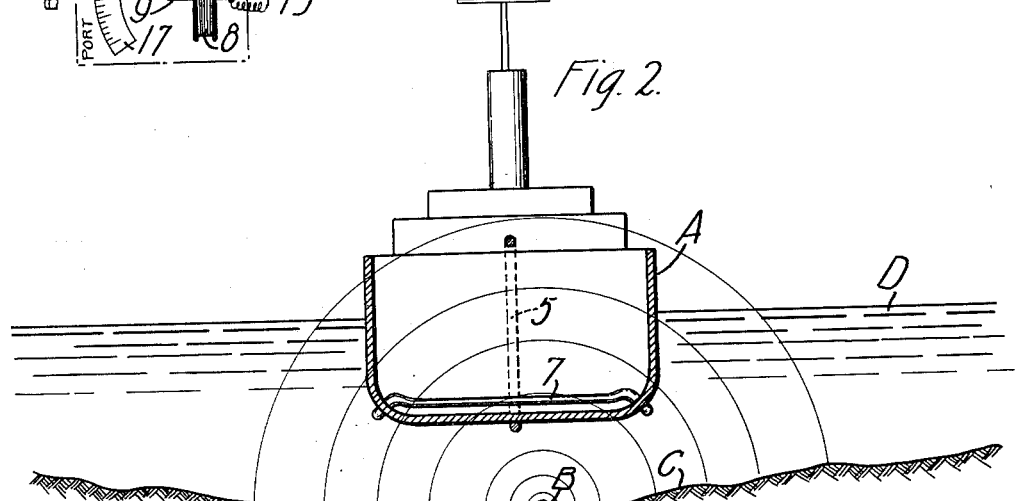
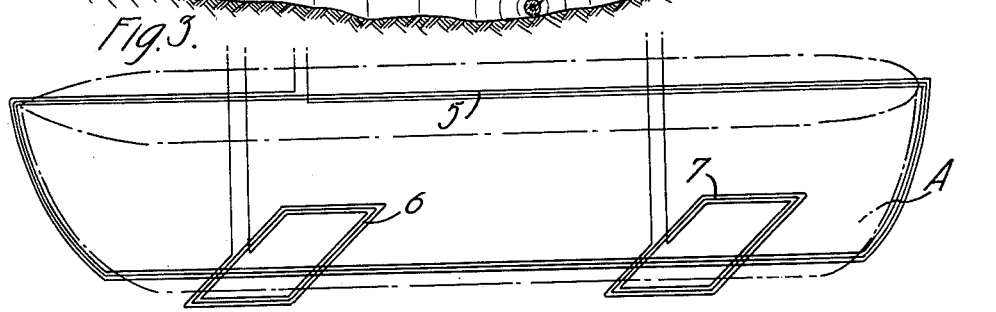
Inventor:
Walter F. Kelley,
by Joel C. R. Palmer Atty.

Patented June 22, 1926. 1,589,398

UNITED STATES PATENT OFFICE.

WALTER F. KELLEY, OF NEW YORK, N. Y., ASSIGNOR TO WESTERN ELECTRIC COMPANY, INCORPORATED, OF NEW YORK, N. Y., A CORPORATION OF NEW YORK.

SYSTEM FOR GUIDING VESSELS.

Application filed December 11, 1922. Serial No. 606,209.

This invention relates to a system for guiding vessels or other moving bodies by means of a submerged cable.

It is an object of the invention to provide means for guiding a vessel in areas of shallow water, through dangerous channels or in heavy fogs.

In carrying out the invention provision is made for determining the angular position of a vessel with respect to a submerged pilot cable. The pilot cable lies at the bottom of navigable water and carries an alternating or interrupted current, radiating magnetic waves which are received upon vessels in the vicinity. Means are provided on board the vessel for translating the magnetic waves into visual indications to be utilized in the guidance of the vessel. In its preferred form, the system includes a pair of indicating meters each having two operating coils which are connected respectively to a vertical receiving loop located in the axis of the vessel and to a horizontal receiving loop located in the bottom of the vessel to indicate the lateral distance between the vessel and the submerged pilot cable. By the use of two such receiving units, the horizontal receiving loop of one being located in the bow and the horizontal receiving loop of the other unit being located in the stern of the vessel, indications of the distance of both the bow and the stern of the ship from the pilot cable are simultaneously obtained, and hence the angle of the ship, with respect to the cable, can be estimated.

Other features and advantages of the invention will appear from a consideration of the following description taken in connection with the accompanying drawing, in which;

Fig. 1 is a diagrammatic illustration of the invention showing a pilot cable and a vessel adapted to be guided thereby.

Fig. 2 is a sectional view taken on the line 2—2 of Fig. 1.

Fig. 3 is a diagrammatic view showing the arrangement of operating coils in a vessel.

Referring to the drawing, A denotes the hull of a vessel to be guided by a pilot cable B lying on the bottom of a channel C, the water line being indicated at D. The cable B carries a low frequency alternating current of considerable intensity, the frequency preferably being below the audible range in order to minimize the likelihood of interference from audio transmission sources. The protective outer covering of the cable B consists preferably of bronze or other non-magnetic material.

An electrical coil 5, suitably encased, lies approximately in a vertical plane through the axis of the vessel. The lower portion of this coil is preferably attached below the keel of the vessel for a considerable portion of its length, while the upper portion lies preferably above the main deck of the vessel. It will be noted that this coil will include practically all magnetic induction passing from one side of the vessel to the other within the limits of the coil. A coil 6, suitably encased, is disposed approximately in a horizontal plane at the bottom of the vessel and forward of the middle thereof. A coil 7 is also provided similar to the coil 6 and lying aft of the middle of the vessel. On a steel vessel the coils 6 and 7, or at least the port and starboard portions of them should be below the hull of the vessel so as to include within each coil all of the magnetic induction passing from the water to the bottom of the vessel within the limits of that coil. The athwartship portions of these horizontal coils may be within the hull of the vessel or above the decks, thus reducing the friction from the motion of the vessel, since these portions of the coils are of little or no use in cutting the magnetic flux from the pilot cable B. Each coil 5, 6, and 7 preferably, consists of a small insulated conductor wound a great number of times and encased into a suitable conduit for protection. Two terminals from each coil are led to the location of the indicating instruments, preferably at the bridge or chart house within easy observation of the pilot.

The indicating instruments may be of any suitable construction, such as the reaction type having a fixed coil 8 and a movable coil 9. The current from the vertical ship coil 5 is led through the fixed coils 8 of both bow and stern instruments by means of conductors 10 and 11. The coils 9 of each instrument are movable on pivots so placed that the axis of rotation is in the plane of the coil, the bearings for the pivots lying in the plane of the windings of the fixed coil. The coils 8 and 9 are so proportioned that the movable coil 9 may rotate about 45° to either side of the central or zero position. Light adjustable hair springs or any other suitable means may be employed to return the movable coils 9 to the zero or central position when there is no current in these coils. The movable coil in the bow instrument is connected in the circuit of the forward horizontal coil 6 by means of conductors 12 and 13, while the movable coil 9 of the stern indicator is connected with the stern horizontal coil 7 by means of conductors 14 and 15. A pointer 16 is fixed to each of the movable coils 9 and is adapted to move adjacent a suitably graduated scale 17, one side of which represents the port and the other the starboard side of the ship. Current in a movable coil 9 in phase with a current in the corresponding fixed coil 8 will cause a movement of the pointer in one direction, and a change of phase 180° in the current in the movable coil will cause a movement of the pointer in a reverse direction. Ordinarily the currents induced in the coils 5, 6 and 7 will be strong enough to give good indications on the instruments, thus eliminating the necessity for local operating power and maintenance, but if this is found impractical due to the great depth at which the cable B is submerged, or for other reasons, amplifiers 18 may be connected in circuit with the conductors leading from the vertical and horizontal ship coils to the fixed and movable coils of the bow and stern indicators.

In considering the operation of the system, it will be obvious that while the equipped vessel is near the submerged cable B, which carries an alternating current as described, the varying magnetic field of the cable will cause induced currents in the vertical coil 5 and horizontal coils 6 and 7. When the longitudinal axis of the vessel, and hence of vertical coil 5, is over and parallel to the line of the cable there will be no induced current in coil 5. The arrangement of the coils 5, 6 and 7 described above is intended to secure the maximum effect when the vessel is on a course near and parallel to that of the cable B. When the vessel is directly over and parallel to the cable B the current induced in the vertical coil 5 will be a maximum. At the same time, however, the E. M. F.'s generated in the horizontal coils 6 and 7 will have equal and opposed components in each coil, making the net E. M. F.'s zero for these coils, the pointers of the bow and stern instruments therefore being held at the middle or zero position, thus indicating to the observer that the vessel is directly over the cable. When the vessel is near to and at one side of the cable B and approximately parallel thereto, the vertical coil 5 and the coils 8 of the bow and stern instruments will have considerable and equal currents. However, due to the fact that one longitudinal part of each horizontal ship coil 6 and 7 is nearer to the cable B by nearly the width of the vessel than is the other longitudinal part of the same coil there will be corresponding changes in the magnetic flux through these coils with resulting currents in them and in the movable coils 9 of the instruments with which they are respectively connected. In both the bow and stern indicating instruments there will be a magnetic reaction due to the currents in the fixed and movable coils which will tend to deflect the movable coils 9, causing them to move against the restraint of the springs or other means which normally hold them in a central or zero position. The displacement of the attached pointers 16 will be a measure of the strength of the reaction and hence of the induction from the submerged cable which causes it. The scale 17 over which the pointers move, if desired, may be calibrated to indicate approximately the distance of the cable and the side of the ship on which it lays. Should the vessel be in a position with the cable near to the opposite side and approximately parallel a similar condition will be obtained, except that the currents in the horizontal coils will have a phase difference of 180° from that just previously described, causing the movement of the pointers in the opposite direction. As an alternate construction, the fixed and movable coils may be interchanged, the movable coils 9 being connected in series with the vertical ship coil 5, and the fixed coils 8 being connected respectively with the bow and stern horizontal ship coils.

In Fig. 1 the vessel is shown lying almost diagonally across the submerged cable, the forward horizontal coil 6 passing directly over the cable while the aft horizontal coil 7 lies almost wholly on one side of the cable. In this case it will be evident that the pointer 16 of the bow indicator will rest in a central or zero position, while the pointer 16 of the stern indicator will be deflected to the right, indicating that the cable lies on the starboard side of the stern of the ship. As the bow and stern instruments indicate the positions of the bow and stern of the vessel with respect to the cable B it will be quite simple to judge the course of the vessel with respect to that of the cable and to maintain the course of the vessel parallel to and directly over the cable. It will likewise be possible to guide the vessel in any other desired direction in relation to the cable.

Where the cable B is laid approximately along the median line of a channel it will be evident that it will be a simple matter for a vessel to follow the course of such a cable, maintaining the course at a safe distance to the right of the median line of the channel and thus meeting and passing similarly equipped and operated vessels without danger of collision. When meeting or overtaking vessels not equipped with this system the dangers of collision will be reduced because the navigator of the equipped vessel will be able to judge accurately his course and how far to one side of the cable he may safely go in avoiding danger.

Where several pilot cables are near enough together to lead to confusion in following any one of them, the currents in these cables may be of different frequencies and the circuits of the guiding apparatus on the vessel may be adjustably tuned to be reponsive only to the cable which it is desired to follow.

Certain changes may obviously be made in the detailed construction of the system described above, and accordingly it is not intended to limit the invention thereto except as defined by the appended claims.

The invention claimed is:

1. A system of navigation comprising a submerged cable adapted to be energized by a source of current to create a variable magnetic field thereabout, a vessel to be guided over the course prescribed by said cable, an electrical coil mounted in a vertical plane on said vessel, a plurality of electrical coils mounted horizontally on different parts of said vessel transversely to said first mentioned coil for translating electromagnetic waves into electrical effects, and means responsive to said electrical effects for indicating the position of said vessel with respect to said cable.

2. A system of navigation comprising a submerged cable adapted to be energized by a source of current to create a variable magnetic field thereabout, a vessel to be guided over the course prescribed by said cable, an electrical coil mounted in a vertical plane on said vessel, other electrical coils mounted horizontally on different parts of said vessel transversely of said first mentioned coil for translating electromagnetic waves generated by said cable into electrical effects, a plurality of indicating instruments comprising fixed and movable coils responsive to said electrical effects for indicating the angular position of said vessel with respect to said cable.

3. A system of navigation comprising a submerged cable adapted to be energized by a source of current to create a magnetic field thereabout, a vessel to be guided over the course prescribed by said cable, an electrical coil mounted substantially in a vertical plane through the longitudinal axis of the vessel, an electrical coil mounted horizontally in the bow of said vessel, an electrical coil mounted horizontally in the stern of said vessel, a pair of indicating instruments each comprising a fixed and a movable coil, the fixed coil of each instrument being in circuit with the longitudinally disposed coil and the movable coils of the instruments being in circuit respectively with the bow and stern ship coils whereby the current radiated by said cable and induced in the ship coils will cause the operation of the movable coils in said indicating instruments, and a pointer mounted on each of said movable coils indicating the orientation of said vessel with respect to said cable.

4. In a system of navigation comprising a submerged cable adapted to be energized by a source of current to create a magnetic field thereabout, a vessel to be guided over the course directed by said cable, a coil disposed in a vertical plane in the longitudinal axis of said vessel, coils at each end of the vessel having their longitudinal axes disposed angularly with respect to the direction of the axis of the first mentioned coil, each of said coils being inductively related to said cable and independently operable indicator devices responsive to the change in the phase relation of the induced currents in said coils for indicating the position of said vessel with respect to said cable.

In witness whereof, I hereunto subscribe my name this 8th day of December A. D., 1922.

WALTER F. KELLEY.